(No Model.)

E. H. FOOTE.
BICYCLE.

No. 334,578. Patented Jan. 19, 1886.

WITNESSES.
J. M. Hartnell.
B. W. Williams

INVENTOR.
Edward H. Foote,
By his atty.,
Henry W. Williams.

UNITED STATES PATENT OFFICE.

EDWARD H. FOOTE, OF SOMERVILLE, MASSACHUSETTS.

BICYCLE.

SPECIFICATION forming part of Letters Patent No. 334,578, dated January 19, 1886.

Application filed September 30, 1885. Serial No. 178,620. (No model.)

*To all whom it may concern:*

Be it known that I, EDWARD H. FOOTE, of Somerville, in the county of Middlesex and State of Massachusetts, have invented a new and useful Attachment for Bicycles, of which the following is a specification.

The object of this invention is to provide a device attachable to any bicycle of the crank pattern for the purpose of preventing the liability to that class of accidental falls known as "headers"—such as are caused by stones, bricks, sticks, and other small obstacles liable to be encounted on ordinary highways.

Figure 1:
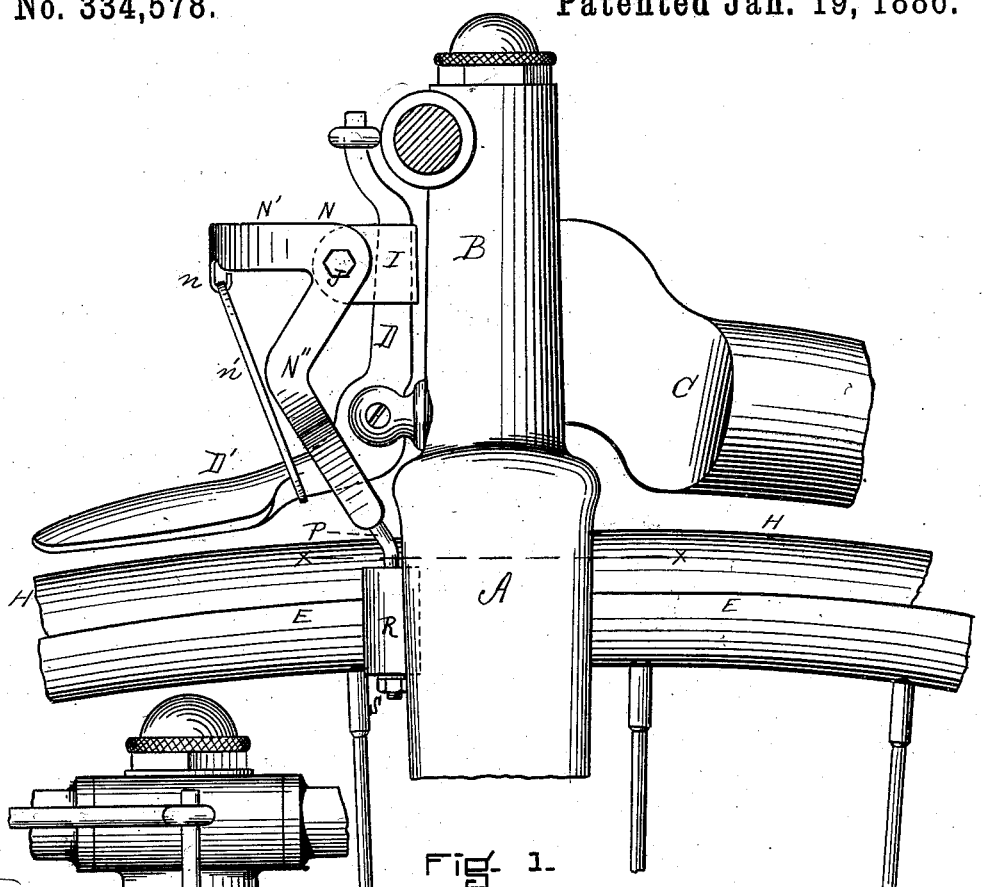
Figures 2, 3:
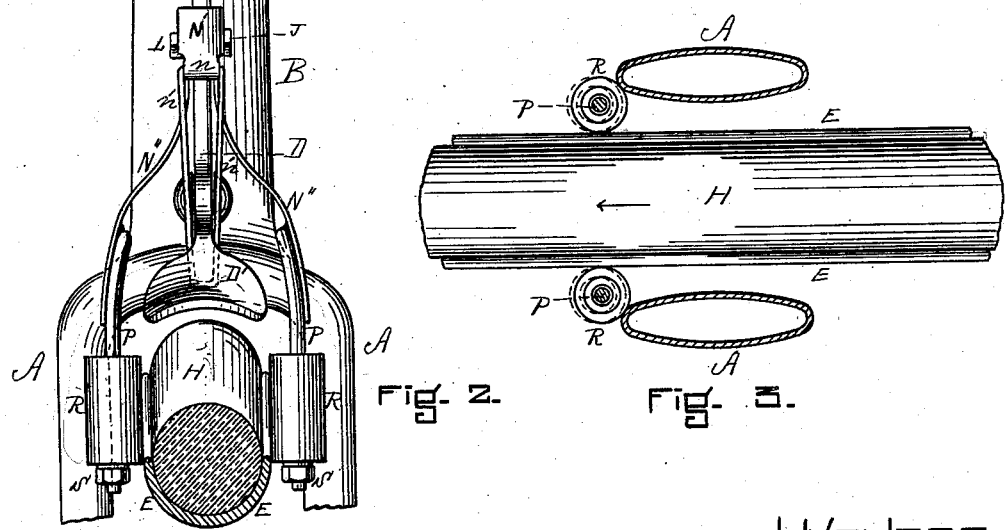

In the accompanying drawings, in which similar letters of reference indicate like parts, Figure 1 is a side elevation of a portion of a bicycle with my attachment in position thereon. Fig. 2 is a front elevation of the same with the wheel in section. Fig. 3 is a horizontal section on line $x$, Fig. 1.

A represents the fork, B the head, C the perch or backbone, and D the brake, E the felly or rim of the driving-wheel, and H the rubber tire, of an ordinary crank-bicycle.

I is a clip bent, as shown, around the vertical portion of the brake D and pressed tightly against the sides of said brake, so as to prevent its slipping thereupon, by means of the bolt J and nut L.

N is a bifurcated frame of substantially the shape shown, perforated, so as to allow the bolt J to pass through it, and hung upon said bolt between the outer sides of the clip and the head of the bolt on one side and nut L upon the other. The horizontal portion N' of this frame is provided at its forward end with a hook, $n$, from which a spring or rubber band, $n'$, extends to the spoon portion D' of the brake. The legs N'' of the frame extend down on opposite sides of the brake, bending rearward, as shown, and are provided at their lower ends with vertical rods P, which form bearings for the rolls R, made externally preferably of rubber or similar material. These rolls are prevented from dropping off the rods P by nuts S, said rods being threaded for the purpose.

The clip I is placed at such a point on the brake as to bring the rolls R on opposite sides of and on a level with the felly E, and the spring $n'$, by pulling down the portion N' of the frame, forces said rolls back lightly until they touch the fork A. When the bicycle is traveling, the revolutions of the driving-wheel, whose felly is in contact with the two rolls, cause said rolls to rotate, and in practice hold them a fractional part of an inch forward of and away from the fork A.

It is evident that when that kind of a fall termed a "header" is taken, the head and frame of the machine advance more rapidly than the wheel, which may or may not come to an actual stop until the rider has passed forward so as to bring the center of gravity in front of a vertical line drawn through the axis of the driving-wheel.

When my attachment is on the bicycle, and an obstacle is struck which hinders the advance of the wheel sufficiently to throw the rider forward, the fork, in attempting to advance relatively to the felly of the driving-wheel, is instantly checked by the rolls R crowding between said felly and said fork, so that the center of rotation is transferred from the axis of the wheel to the point of contact of the wheel and the obstacle. Of course as long as the center of gravity is behind a vertical line through the axis of the driving-wheel the rider will not fall forward.

My device, by lowering the center of rotation, carries the vertical line forward with the rider, and causes the wheel to mount and pass over the obstacle, if it be not too large, before the rider has reached a position in advance of this line.

A minor advantage of the device is that when the bicycle is resting against an object it is less likely to roll and fall, as the driving-wheel can turn in but one direction.

In handling the machine the frame should be lifted in order to allow the driving-wheel to turn in both directions.

To render the attachment inoperative, the spring $n'$ can be removed from under the brake and caught over the head, thus swinging the frame on its pivot until the rolls are above the wheel.

Of course I do not confine myself to the exact shape shown in the drawings, nor to any especial material in the construction.

Having thus fully described my invention, what I claim, and desire to secure by Letters Patent, is—

1. An automatic safety attachment for crank-bicycles, consisting, essentially, of a frame pivoted to a stationary portion of a bicycle, and provided with stops hanging on opposite sides of the felly of the driving-wheel, next the front edges of the fork, substantially as and for the purpose described.

2. An automatic safety attachment for crank-bicycles, consisting, essentially, of a frame pivoted to a stationary portion of a bicycle, and provided with friction-rolls hanging on opposite sides of the felly of the driving-wheel, next the front edges of the fork, substantially as and for the purpose described.

3. The hereinbefore-described automatic safety attachment for crank-bicycles, consisting, essentially, of the clip I, secured to the brake, bifurcated frame N, pivoted to said clip, and provided with the rods P and friction-rolls R, and a spring extending from the upper portion of said frame to the brake-spoon, for the purpose of holding said rolls against the fork, substantially as and for the purpose set forth.

EDWARD H. FOOTE.

Witnesses:
J. M. HARTNETT,
HENRY W. WILLIAMS.